Oct. 30, 1928.
J. H. BROOKMAN
1,689,774
LIFTING DEVICE FOR VEHICLE WHEELS
Filed April 9, 1927
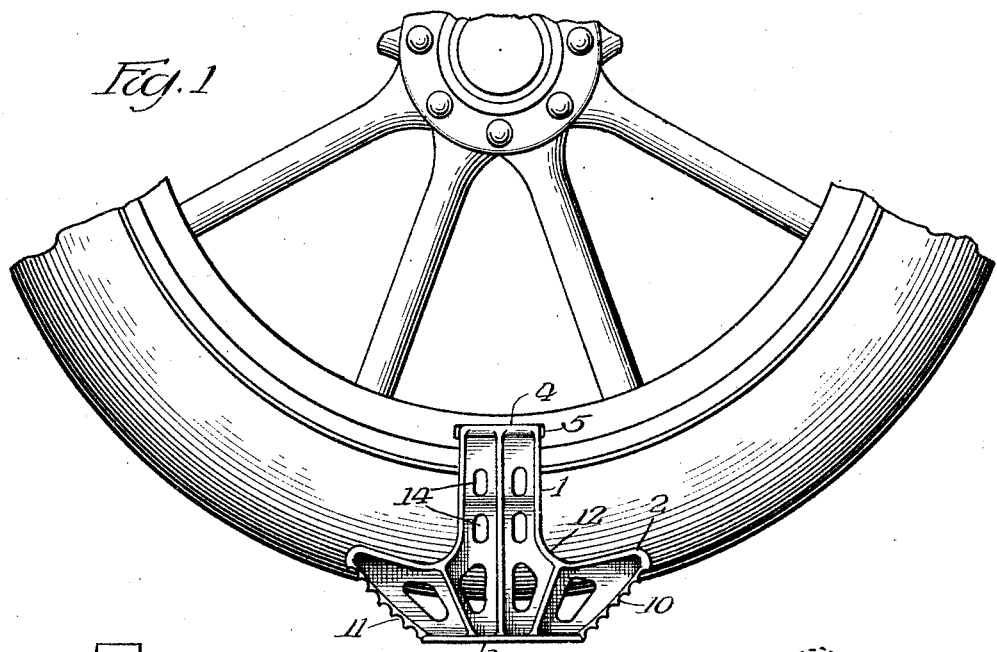
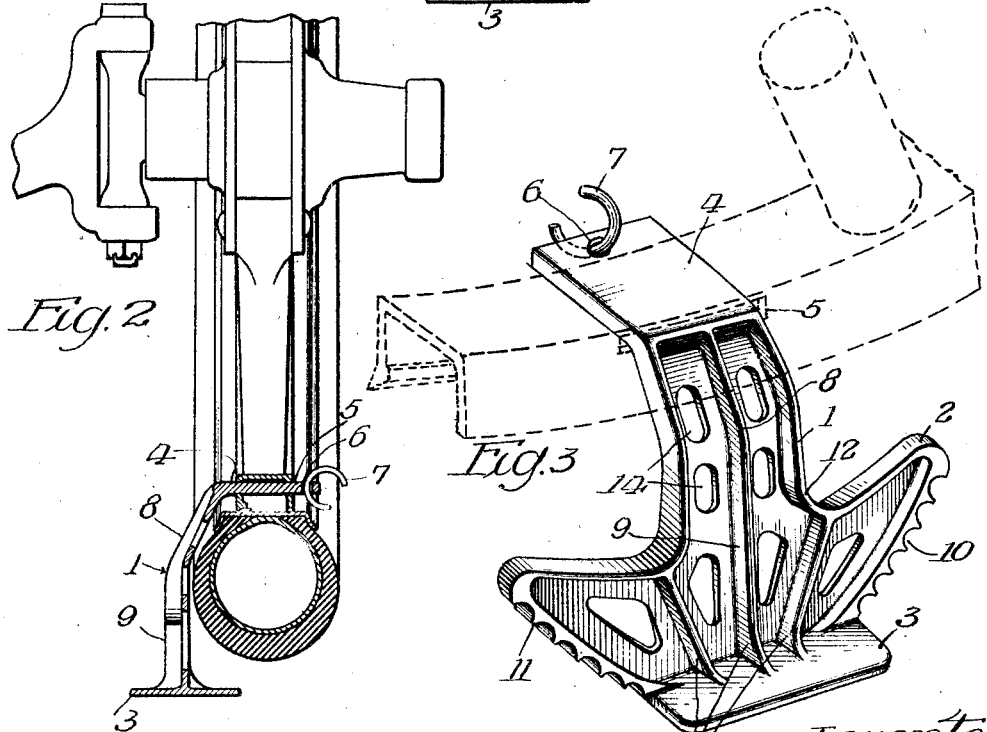
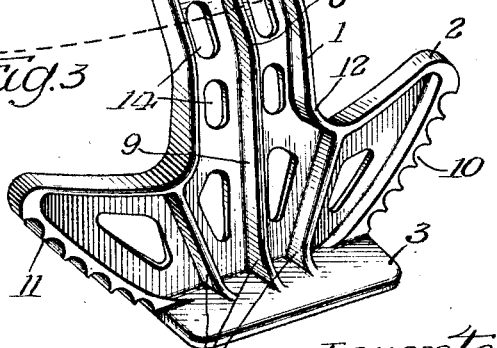
Inventor
John H. Brookman
By Wm. O. Bell Atty Patented Oct. 30, 1928.

1,689,774

UNITED STATES PATENT OFFICE.

JOHN H. BROOKMAN, OF CEDAR RAPIDS, IOWA.

LIFTING DEVICE FOR VEHICLE WHEELS.

Application filed April 9, 1927. Serial No. 182,309.

This invention relates to automobile lifting devices for vehicles having pneumatic tires and more particularly to a one-piece structure which has a lateral lug to cooperate with a slot in a wheel felly whereby a vehicle may be lifted above the ground. The lug being inserted in the slot of the wheel at any convenient position when the device is brought into play by the travel of the car.

The object of the invention is to provide an improved lifting device made in one piece which has a member cooperating with a slot in the vehicle wheel felly to permit the car to be raised without any manual labor.

Another object thereof is to provide a lifting device which is made in one piece, which is simple and efficient and which may be readily and economically manufactured.

In accordance with the invention the lifting device comprises in general a one-piece structure of sufficient height and which has a flange adapted to be inserted in a slot in the wheel felly which is capable of raising the wheel when the same is rotated to relative position.

A preferred embodiment of the invention is shown in the accompanying drawings in which Fig. 1 is an elevation of the lifting device secured in place on an automobile wheel.

Fig. 2 is a vertical section of the device applied to an automobile wheel, and

Fig. 3 is a front perspective view of the device.

Referring to the drawings the lifting device has a body 1 having outwardly extending projections or extensions 2 integrally formed thereon. Attached to the lower end of the body and connecting the projections 2 is a flat portion forming a base 3. Substantially at right angles to the body and integrally formed therewith is a lug 4 for engaging a slot 5 to be provided in the felly of an automobile wheel. This slot is slightly larger than the lug 4 to accommodate the same and extends all the way through the felly. The lug 4 is made of sufficient length to extend through the opposite side of the wheel and may be provided with a hole 6 to accommodate a ring or other holding member 7.

While it is not necessary to form this lug of a length sufficient to pass all the way through the felly it has been found preferable in actual practice to provide this extra length in order to attach some means thereto to prevent the jack from falling out of the recess.

It is understood that the device may be applied in the slot regardless of the position of the wheel and the wheel rotated preferably under the power of the vehicle until it attains the position shown in Fig. 1 thereby suspending the wheel from the ground. Sufficient clearance being provided of course to keep the bottom of the tire in its inflated condition off the ground.

The device is applied to the inside of the rim so that the tires may be readily removed or replaced. It has been found preferable in actual practice to provide the slot directly opposite the valve for reasons well known to the art.

To allow the tire to have sufficient clearance the body 1 may have an inclined portion 8 as clearly shown in Fig. 2 and this provides the necessary clearance between the upright portion 9 of the body and the automobile tire.

The outwardly extending projection 2 has an inclined portion 10 on the lower edge thereof to provide a rounded or tractable edge to facilitate a car to ride up thereon when the device is attached to the wheel. These inclined edges 10 are provided with a series of consecutively arranged teeth 11 formed along the edge of the inclined surface to provide a gripping or non-skid surface.

The body has a laterally extending flange 12 around the entire periphery thereof to strengthen the same. Webs or braces 13 are provided to further strengthen the device and connect the flange 12 at different positions thereon to the base 3.

The base 3 is made flat to provide a fully supporting surface for the lifting device.

The body 1 may also be provided with perforations 14 formed therein to lessen the weight of the jack.

The device is primarily intended to form an efficient device for raising the car, principally for the removal or replacement of tires or for adjusting brakes, or to perform similar functions but it is also adapted to be used as a safety or theft preventing device. Where it is to be used as a theft preventing device a suitable lock may be substituted in place of the ring 7.

In applying the device the lug 4 is inserted in the slot 5 formed in the wheel felly and the vehicle is moved under its own power to rotate the wheel. In the rotation of the wheel the inclined edge 10 will grip the pavement or ground and tend to raise the wheel off the ground and the movement is continued slowly until the edge of the base contacts with the ground; the base of course, being of sufficient length to hold the car in position and to prevent the same from riding off.

In actual practice it has been found that the fellies of automobile wheels are made of metal and are of sufficient strength to prevent the lug from fracturing or bulging the inside portion of the felly.

From the foregoing description it will be seen that a lifting device has been provided which is readily accessible, which contains new and novel features in the art.

Of course various changes in form, construction and arrangement of parts may be made without departing from the spirit or sacrificing any of the advantages of the invention and the right is hereby reserved to make all such changes as fairly fall within the scope of the following claims.

The invention is claimed as follows:

1. The combination of a wheel felly having a slot therethrough of a lifting device cooperating with said slot and comprising a base, a body integral with said base, a lug integral with said body and substantially parallel with said base and adapted to be received in said slot, outwardly extending projections on the sides of said body and integral with said body and said base, said projections extending upwardly substantially midway between the base and the lug and provided with rounded bottoms, and ground engaging teeth on said rounded bottoms arranged progressively outward from bottom to the upper end of the said bottoms.

2. A combination of a wheel felly having a slot therethrough, of a one-piece lifting device cooperating with said slot and comprising a base, a relatively flat body integral with said base, said body having a substantially straight lower part and an inclined upper part, a lug integral with said upper part and substantially parallel with the base and adapted to be received in said slot, said lug being provided with a hole therethrough to receive a holding member to prevent withdrawal of said lug from the slot; outwardly extending projections integral with the lower portion of said body and extending substantially midway between the top of the base and the bottom of the lug, said projections having rounded bottoms, and ground engaging teeth on said bottoms.

JOHN H. BROOKMAN.